(12) United States Patent
Moscatiello et al.

(10) Patent No.: US 11,609,800 B2
(45) Date of Patent: Mar. 21, 2023

(54) SYSTEMS AND METHODS FOR PROVIDING A HYBRID MOBILE APPLICATION

(71) Applicant: Capital One Services, LLC, McLean, VA (US)

(72) Inventors: Joseph Moscatiello, New Tecumseth (CA); Zak Beharie, Oakville (CA); Christopher Primerano, Alliston (CA)

(73) Assignee: Capital One Services, LLC, McLean, VA (US)

(*) Notice: Subject to any disclaimer, the term of this patent is extended or adjusted under 35 U.S.C. 154(b) by 62 days.

(21) Appl. No.: 16/998,802

(22) Filed: Aug. 20, 2020

(65) Prior Publication Data
US 2022/0058063 A1 Feb. 24, 2022

(51) Int. Cl.
*G06F 7/06* (2006.01)
*G06F 9/54* (2006.01)
*G06F 9/445* (2018.01)
*G06F 8/52* (2018.01)
*G06F 8/41* (2018.01)

(52) U.S. Cl.
CPC .............. *G06F 9/541* (2013.01); *G06F 8/447* (2013.01); *G06F 8/52* (2013.01); *G06F 9/44542* (2013.01)

(58) Field of Classification Search
CPC . G06F 9/541; G06F 8/447; G06F 8/52; G06F 9/44542
See application file for complete search history.

(56) References Cited

U.S. PATENT DOCUMENTS

| 3,640,093 | A | 2/1972 | Levene et al. |
| 8,640,093 | B1* | 1/2014 | Gill ............................ G06F 9/44 717/120 |
| 9,218,162 | B1 | 12/2015 | Blume et al. |
| 2012/0084864 | A1 | 4/2012 | Mahaffey et al. |
| 2016/0266889 | A1* | 9/2016 | Gross ........................ H04L 67/34 |
| 2016/0323690 | A1* | 11/2016 | Daoud .................... G05B 15/02 |
| 2017/0352115 | A1* | 12/2017 | Trevathan ............ G06Q 50/184 |

OTHER PUBLICATIONS

Kewal Shah et al. "Analysis of Cross-Platform Mobile App Development Tools", Mar. 2019. (Year: 2019).*
Ayoub Korchi et al. "Classification of existing mobile cross-platform approaches" (Year: 2020).*

* cited by examiner

Primary Examiner — Timothy A Mudrick
Assistant Examiner — Abdou K Seye
(74) *Attorney, Agent, or Firm* — Bookoff McAndrews, PLLC (57) ABSTRACT

Disclosed are systems and methods for providing a hybrid mobile application. The method may include: receiving specification of at least one feature of a mobile application. The mobile application may be specific to a first programming platform. The method may further include generating the at least one feature based on the specification. The at least one feature may be written in a programming language specific to a second programming platform, and the second programming platform may be different from the first programming platform. The method may also include compiling a programming wrapper based on the at least one feature of the mobile application, combining the at least one feature and the programming wrapper into a programming component, packaging the programming component into the mobile application, and distributing the mobile application in a repository of the first programming platform.

20 Claims, 4 Drawing Sheets

SYSTEMS AND METHODS FOR PROVIDING A HYBRID MOBILE APPLICATION

TECHNICAL FIELD

Various embodiments of the present disclosure relate generally to mobile applications, and, more particularly, to systems and methods for providing a hybrid mobile application.

BACKGROUND

Cross-platform application development frameworks, such as Flutter or the like, enable developers to create mobile applications that are compatible with more than one operating system. For example, such frameworks may enable developers to create mobile applications compatible with both Android and iOS. The frameworks may provide tools that enable the developers to write the code for the mobile application once and then run it on the various operating systems.

However, current cross-platform application development frameworks may require the framework code to be embedded into the mobile application separately from the cross-platform feature code that is to be implemented. For example, the specific framework code must be coupled with the mobile application code such that the mobile application must be developed to support the specific framework code. Thus, current cross-platform mobile applications may be complex and may be required to recompile periodically. Accordingly, such a framework architecture may require a larger amount of processing power and time.

The systems and methods of the present disclosure may solve one or more of the problems set forth above and/or other problems in the art. The scope of the current disclosure, however, is not defined by the attached claims, and not by the ability to solve any specific problem. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for providing a hybrid mobile application. Each of the examples disclosed herein may include one or more of the features described in connection with any of the other disclosed examples.

In one embodiment, a computer-implemented method for providing a hybrid mobile application is disclosed. The method may include: receiving, by one or more processors, specification of at least one feature of a mobile application, wherein the mobile application may be specific to a first programming platform; generating, by the one or more processors, the at least one feature based on the specification, wherein the at least one feature may be written in a programming language specific to a second programming platform, wherein the second programming platform may be different from the first programming platform; compiling, by the one or more processors, a programming wrapper based on the at least one feature of the mobile application; combining, by the one or more processors, the at least one feature and the programming wrapper into a programming component; packaging, by the one or more processors, the programming component into the mobile application; and distributing, by the one or more processors, the mobile application in a repository of the first programming platform.

In another embodiment, a computer system for providing a hybrid mobile application is disclosed. The computer system may include: a memory having processor-readable instructions stored therein; and at least one processor configured to access the memory and execute the processor-readable instructions, which when executed by the processor configures the processor to perform a plurality of functions, including functions for: receiving specification of at least one feature of a mobile application, wherein the mobile application is specific to a first programming platform; generating the at least one feature based on the specification, wherein the at least one feature is written in a programming language specific to a second programming platform, wherein the second programming platform is different from the first programming platform; compiling a programming wrapper based on the at least one feature of the mobile application; combining the at least one feature and the programming wrapper into a programming component; packaging the programming component in to the mobile application; and distributing the mobile application in a repository of the first programming platform.

In yet another embodiment, a computer-implemented method for providing a hybrid mobile application is disclosed. The method may include: receiving, by one or more processors, specification of at least one feature of a mobile application, wherein the mobile application is specific to a first programming platform; generating, by the one or more processors, the at least one feature based on the specification, wherein the at least one feature is written in a programming language specific to a second programming platform, wherein the second programming platform is different from the first programming platform; compiling, by the one or more processors, a programming wrapper based on the at least one feature of the mobile application; combining, by the one or more processors, the at least one feature and the programming wrapper into a programming component; packaging, by the one or more processors, the programming component in to the mobile application; receiving, by the one or more processors, an activation of the at least one feature in the mobile application; invoking, by the one or more processors, the programming component by the mobile application; translating, by the one or more processors via the programming wrapper, the at least one feature from the second programming platform to the first programming platform; and executing, by the one or more processors, the at least one feature in the mobile application.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to mobile applications, and, more particularly, to systems and methods for providing a hybrid mobile application.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" or "computing device" generally encompasses any device or combination of devices, each device having at least one processor that executes instructions from a memory medium. Additionally, a computer system may be included as a part of another computer system.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure provides for systems and methods for providing a hybrid mobile application. Embodiments of the present disclosure may provide for using a cross-platform development framework, such as Flutter, React Native, Xamarin, or the like, to develop a cross-platform or hybrid mobile application. As used herein, a "cross-platform" or "hybrid" mobile application is a mobile application that can be deployed or published on multiple platforms using a single (e.g., only one) codebase, instead of having to develop the mobile application multiple times using the respective native technologies for each platform. Embodiments of the present disclosure may provide for bundling at least one feature and the programming wrapper (including the frameworks) into a library or piece of code separate from the main mobile application. The library or piece of code may then be packaged into the code for the main mobile application to generate the feature of the mobile application. Thus, the feature for the mobile application may be agnostic of any specific programming language such that the feature can be implemented in a mobile application and deployed for both Android and iOS.

The one or more features may be written in a programming language specific to a second programming platform, such as Flutter, React Native, Xamarin, or the like. A programming wrapper may be compiled based on the features. The programming wrapper and the features may be combined into a programming component. For example, the programming wrapper be may embedded into a programming wrapper module that includes one or more frameworks of the programming wrapper. The frameworks may be used to translate the features from the cross-platform development tool to Android or iOS, as desired. The programming wrapper module may then generate the programming component. The programming component may include a library or piece of code that contains the features, the programming wrapper, and the necessary frameworks. The programming component then may be packaged into the mobile application and deployed for Android, iOS, or any other platform.

Further, the systems and methods herein may enable a first feature to be written using a first cross-platform development tool and a second feature to be written using a second cross-platform development. For example, the first feature may be written in Flutter and the second feature may be written in React Native, and both features may be compiled and deployed in the mobile application, as described above.

Thus, the systems and methods of the present disclosure may provide increased processing speed in developing and deploying a cross-platform mobile application. For example, the systems and methods disclosed herein may reduce or eliminate the need to recompile the main mobile application periodically. Thus, the embodiments of the present disclosure may provide for an improvement to technology areas, such as computing processing, as well as improvements to developing, deploying, or otherwise providing, cross-platform or hybrid mobile applications.

Figure 1:
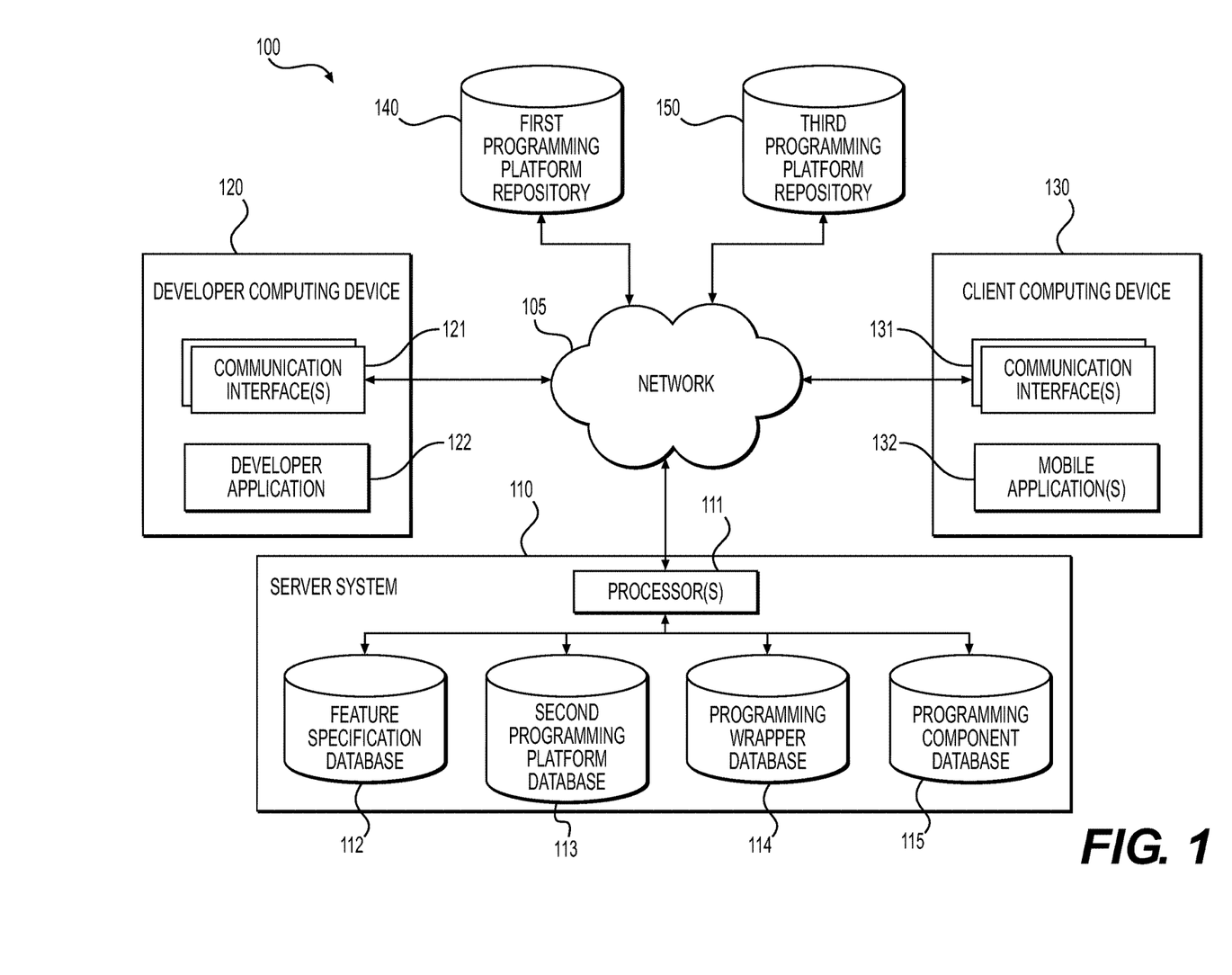
FIG. 1 depicts an exemplary system environment for providing a hybrid mobile application, according to one or more embodiments.

Referring now to the appended drawings, FIG. 1 is a diagram depicting an exemplary system environment 100 for providing a hybrid mobile application, according to embodiments of the present disclosure. As shown in FIG. 1, system environment 100 may include a server system 110, a developer computing device (or a device associated with a developer) 120, and a client computing device (or a device associated with a client) 130. Server system 110, developer computing device 120, and client computing device 130 may be in communication with each other via a network 105, such as the Internet, as detailed below.

Embodiments of the present disclosure may utilize a first programming platform, a second programming platform, and a third programming platform, as detailed below. As used herein, a "programming platform" includes a software platform that encompasses necessary components, frameworks, application programming interfaces, and/or libraries to enable software developers, programmers, and/or other developers to author, compile, debug, and/or execute programming language-specific applications. In some embodiments, programming platforms may include development tools that enable application development. While three programming platforms are depicted in the exemplary embodiment herein, it is understood that any number of programming platforms may be utilized as desired or as necessary.

Network 105 may be any suitable network or combination of networks and may support any appropriate protocol suitable for communication of data to and from the server system 110 and between various other components in the system environment 100 (e.g., developer computing device 120 and client computing device 130). Network 105 may include a public network (e.g., the Internet), a private network (e.g., a network within an organization), or a combination of public and/or private networks. Network 105 may be configured to provide communication between various components depicted in FIG. 1. Network 105 may comprise one or more networks that connect devices and/or components in the network layout to allow communication between the devices and/or components. For example, the network may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 105 may be implemented using cell and/or pager networks, satellite, licensed radio, or a combination of licensed and unlicensed radio.

Figure 4:
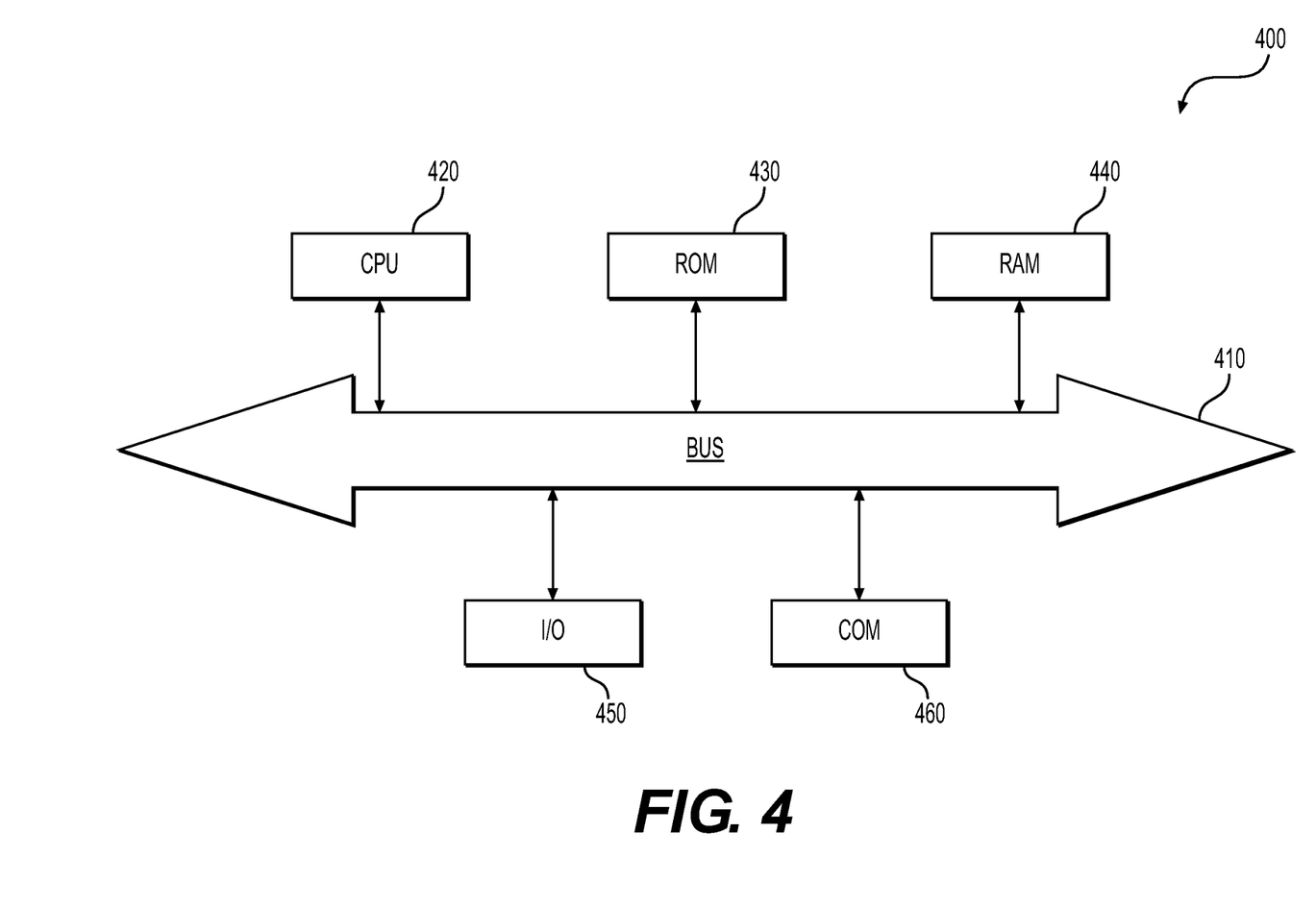
FIG. 4 depicts an example system that may execute techniques presented herein.

The server system 110 may include computing systems, such as system 400 described with respect to FIG. 4. As such, server system 110 may include one or more processors and a memory for storing and executing applications or software modules of system environment 100. For example, server system 110 may include one or more software modules to communicate with user devices (e.g., developer computing device 120 and client computing device 130) and/or other computing devices through network 105. Further, the one or more processors may be configured to access the memory and execute processor-readable instructions, which when executed by the processor configures the processor to perform a plurality of functions of the system environment 100. For example, the one or more processors may include one or more processors 111 for providing a hybrid mobile application, as detailed further below.

Server system 110 may further include one or more modules, models, engines, or databases, including a feature specification database 112, a second programming platform database 113, a programming wrapper database 114, and a programming component database 115, which may be software components stored in/by the server system 110 (e.g., stored on the memory). It is understood that databases 112-115, or portions thereof, may be located outside of server system 110 such that server system 110 may access databases 112-115 through, for example, network 105. Alternatively, or additionally, the databases 112-115, or portions thereof, may be included as part of a developer application 122, as described below. The server system 110 may be configured to utilize the one or more modules, models, engines, or databases when performing various methods described in this disclosure. In some embodiments, server system 110 may have a cloud computing platform with scalable resources for computation and/or data storage, and may run one or more applications on the cloud computing platform to perform various computer-implemented methods described in this disclosure. In some embodiments, some of the modules, models, engines, or databases may be combined to form fewer modules, models, engines, or databases. In some embodiments, some of the modules, models, engines, or databases may be separated into separate, more numerous modules, models, engines, or databases. In some embodiments, some of the modules, models, engines, or databases may be removed while others may be added.

Server system 110 may be configured to receive data from, or send data to, other components (e.g., developer computing device 120 and/or client computing device 130) of system environment 100 via network 105. Server system 110 may further be configured to utilize the received data to produce a result (e.g., a hybrid mobile application), as detailed below. Information indicating the result may be transmitted to developer computing device 120 and/or client computing device 130 over network 105. In some embodiments, the server system 110 may provide a service including providing the information indicating the received data and/or the result to the developer computing device 120 and/or client computing device 130. Server system 110 may be part of an entity, which may include any type of company, organization, or institution that implements one or more applications. In some examples, the entity may be a financial services provider. Server system 110 may implement one or more mobile applications of the entity. As detailed below with respect to FIGS. 2-3, server system 110 (via the one or more processors 111) may be used to develop, distribute, or otherwise provide, a hybrid mobile application 132.

Feature specification database 112 may include one or more databases for storing feature specifications of one or more features of mobile application 132. For example, the one or more processors 111 may receive specification of a feature of mobile application 132 from developer computing device 120 and store the received specification in database 112. The one or more processors 111 may receive the feature specification from database 112 or directly from developer computing device 120, as detailed below. The specification may be written in a programming language specific to a second programming platform. The second programming platform may include, for example, Flutter, React Native, Xamarin, or any other programming platform known in the art.

Second programming platform database 113 may include one or more databases for storing generated features of the mobile application 132. Second programming platform database 113 may also store frameworks, components, application programming interfaces, libraries, and/or tools of the second programming platform.

Programming wrapper database 114 may include one or more databases for storing programming wrappers compiled by the one or more processors 111, as detailed below. The programming wrapper may include a second programming platform wrapper, such as, for example, Flutter wrapper, React Native wrapper, Xamarin wrapper, or the like. The programming wrapper may include an interpreter for translating the at least one feature from the second programming platform to the first programming platform and/or the third programming platform. The one or more processors 111 may combine the feature and the programming wrapper into a programming component.

Programming component database 115 may include one or more databases for storing programming components generated by the one or more processors 111, as detailed below. The programming component may include a programming library that includes the programming wrapper and the at least one feature. In some embodiments, the programming component may include the frameworks of the programming wrapper. The one or more processors 111 may package the programming component into mobile application 132 to generate a hybrid mobile application 132. The one or more processors 111 may also package the programming component into a second mobile application 132, as detailed below.

Developer computing device 120 may be in communication with server system 110 via network 105. Developer computing device 120 may be a computer system that is operated by a user (e.g., a mobile application developer), such as a mobile device (e.g., smartphone, tablet, pager, personal digital assistant (PDA)), a computer (e.g., laptop computer, desktop computer, server), or a wearable device (e.g., smart watch). Developer computing device 120 can also include any other media content player, for example, a set-top box, a television set, a video game system, or any electronic device capable of providing or rendering data. Developer computing device 120 may optionally be portable and/or may be handheld. Developer computing device 120 may include a memory, one or more processors, communication interfaces, input devices, and output devices, as detailed further below with reference to FIG. 4. It is understood that developer computing device 120 may include one or more computing devices accessed by one or more users. For example, a first user may use a first developer computing device 120 and a second user may use a second developer computing device 120.

Developer computing device 120 may include one or more communication interfaces 121. The one or more communication interfaces 121 may include one or more cellular radios, Bluetooth, WiFi, near-field communication radios, or other appropriate communication devices for transmitting and receiving information. As can be seen in FIG. 1, the one or more communication interfaces 121 facilitate communication between developer computing device 120 and network 105. Multiple communication interfaces 121 may be included in developer computing device 120 for providing multiple forms of communication between developer computing device 120 and server system 110 via network 105. For example, communication may be achieved with network 105 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

Developer computing device 120 may operate a client program, also referred to as a developer application 122 or third-party application, used to communicate with the server system 110. This developer application 122 may be used to provide information (e.g., specification of a feature of mobile application 132) to the server system 110 and to receive information from the server system 110. Developer application 122 may include a web-based application accessed through a web browser of developer computing device 120 via network 105. In some examples, the developer application 122 may be a mobile application or other application that is run on developer computing device 120. The developer application 122 may be, or provide communication to, for example, the second programming platform. For example, a developer may install, or otherwise access, the second programming platform (e.g., Flutter, React Native, Xamarin, etc.) on the developer computing device 120 via developer application 122.

Further, while the exemplary embodiment depicts the one or more processors 111 as components of a server system 110, it is understood that the one or more processors 111, or portions thereof, may be located anywhere, such as, for example, as part of developer computing device 120. Thus, the methods provided herein may be executed on server system 110, developer computing device 120, and/or combinations thereof.

Client computing device 130 may be in communication with server system 110 via network 105. Client computing device 130 may be a computer system that is operated by a user, such as a mobile device (e.g., smartphone, tablet, pager, personal digital assistant (PDA)), a computer (e.g., laptop computer, desktop computer, server), or a wearable device (e.g., smart watch). Client computing device 130 can also include any other media content player, for example, a set-top box, a television set, a video game system, or any electronic device capable of providing or rendering data and executing applications. Client computing device 130 may optionally be portable and/or may be handheld. Client computing device 130 may include a memory, one or more processors, communication interfaces, input devices, and output devices, as detailed further below with reference to FIG. 4. It is understood that client computing device 130 may include one or more computing devices accessed by one or more users. For example, a first user may use a first client computing device 130 and a second user may use a second client computing device 130.

Client computing device 130 may include one or more communication interfaces 131. The one or more communication interfaces 131 may include one or more cellular radios, Bluetooth, WiFi, near-field communication radios, or other appropriate communication devices for transmitting and receiving information. As can be seen in FIG. 1, the one or more communication interfaces 131 facilitate communication between client computing device 130 and network 105. Multiple communication interfaces 131 may be included in client computing device 130 for providing multiple forms of communication between client computing device 130 and server system 110 via network 105. For example, communication may be achieved with network 105 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

Client computing device 130 may operate a client program, also referred to as a mobile application 132. Mobile application 132 may be developed by a developer on developer computing device 120 via, for example, developer application 122. Mobile application 132 may include one or more features, as detailed below. Mobile application 132 may be a first mobile application 132 for a first programming platform (e.g., Android) and a second client computing device 130 may include a second mobile application 132 for a third programming platform (e.g., iOS). Accordingly, mobile application 132 may be developed for a first programming platform and/or a third programming platform that is executed, or otherwise runs, on client computing device 130. Thus, mobile application 132 may be developed using a software language specific to the first programming platform or the third programming platform. Accordingly, the one or more processors 111 may be used to provide a hybrid mobile application 132 developed in a programming language specific to a second programming platform and capable of being distributed for both the first programming platform and the third programming platform, as detailed below.

System environment 100 may also include a first programming platform repository 140 and a third programming platform repository 150. Repositories 140,150 may be an application store, such as Apple App Store, Google Play store, or the like. Repositories 140, 150 may receive the developed mobile application 132. A user of a respective client computing device 130 may access the respective repository 140, 150 to download and install the mobile application 132 on the client computing device 130. Therefore, the mobile application 132 may be deployed, or otherwise distributed, to the client computing device 130 via a respective repository 140, 150.

Figure 2:
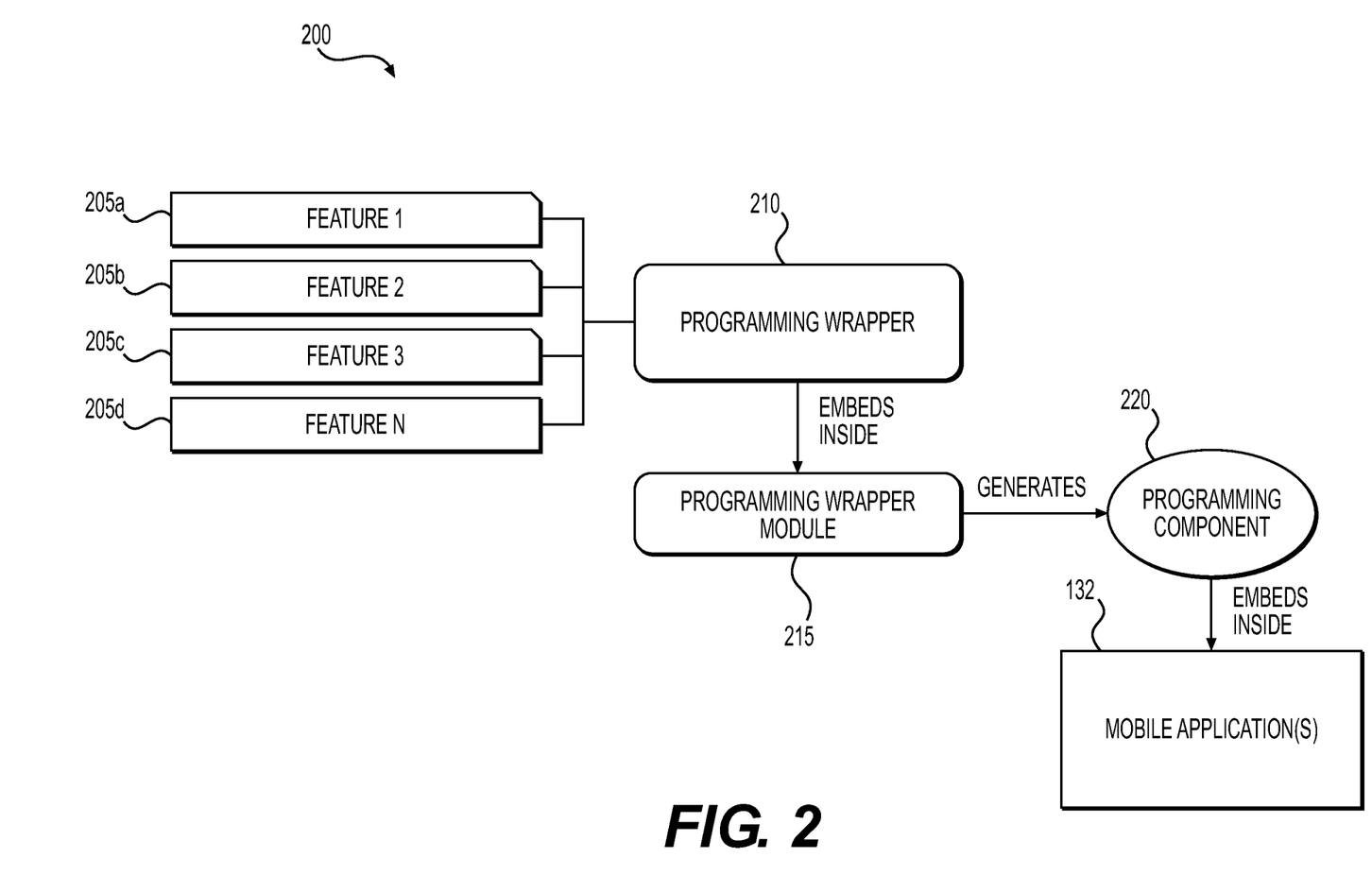
FIG. 2 depicts a flow diagram of a detailed system architecture for providing a hybrid mobile application using the system environment of FIG. 1, according to one or more embodiments.

FIG. 2 depicts a flow diagram of a detailed system architecture 200 for providing a hybrid mobile application 132, according to one or more embodiments herein. As shown in FIG. 2, the system architecture 200 may include at least one feature 205a-205d, a programming wrapper 210, a programming wrapper module 215, a programming component 220, and the mobile application 132. The at least one feature 205a-205d may be features of, and provide functionality for, mobile application 132. For example, features of a mobile banking application may include a credit score tracker feature, a monthly banking statement view feature, a transfer funds feature, or any other desired features. In the exemplary embodiment, system architecture 200 includes a first feature 205a, a second feature 205b, a third feature 205c, and a fourth feature 205d. However, it is understood that system architecture 200 may include any number of features as necessary or desired. Each feature 205a-205d may be developed and written in a programming language specific to the second programming platform. For example, each feature 205a-205 may be written using Flutter, React Native, Xamarin, and/or any other mobile application development platform.

The one or more processors 111 may compile a programming wrapper 210 based on the at least one feature 205a-205d. The programming wrapper 210 may include various scripts for providing and encapsulating various features, functionalities, and/or interfaces. For example, the programming wrapper 210 may wrap multiple functions needed to execute a feature 205a-205d. The programming wrapper 210 may also wrap a single function to enable the function to work with newer or older code. The programming wrapper 210 may be embedded inside the programming wrapper module 215. The programming wrapper module 215 may include one or more frameworks of the second programming platform. The one or more processors 111 may interpret or translate, via the one or more frameworks of the programming wrapper module 215, the at least one feature 205a-205d from a programming language of the second programming platform to a programming language of the first programming platform and/or the third programming platform. For example, the one or more processors 111 may interpret or translate the at least one feature 205a-205d from Flutter to Android and/or iOS.

The one or more processors 111 may then combine the at least one feature 205a-205d and the programming wrapper 210 (e.g., with the programming wrapper module 215) into the programming component 220. The programming component 220 may contain a library (e.g., including the at least one feature 205a-205d, the programming wrapper 210, and the programming wrapper module 215) that may be packaged, or otherwise embedded, into the mobile application 132 as necessary. For example, the programming component 220 may be packaged into a mobile application 132 for use with the first programming platform (e.g., Android) and may be packaged into a mobile application 132 for use with the third programming platform (e.g., iOS). Thus, a hybrid mobile application 132 may be provided.

Figure 3:
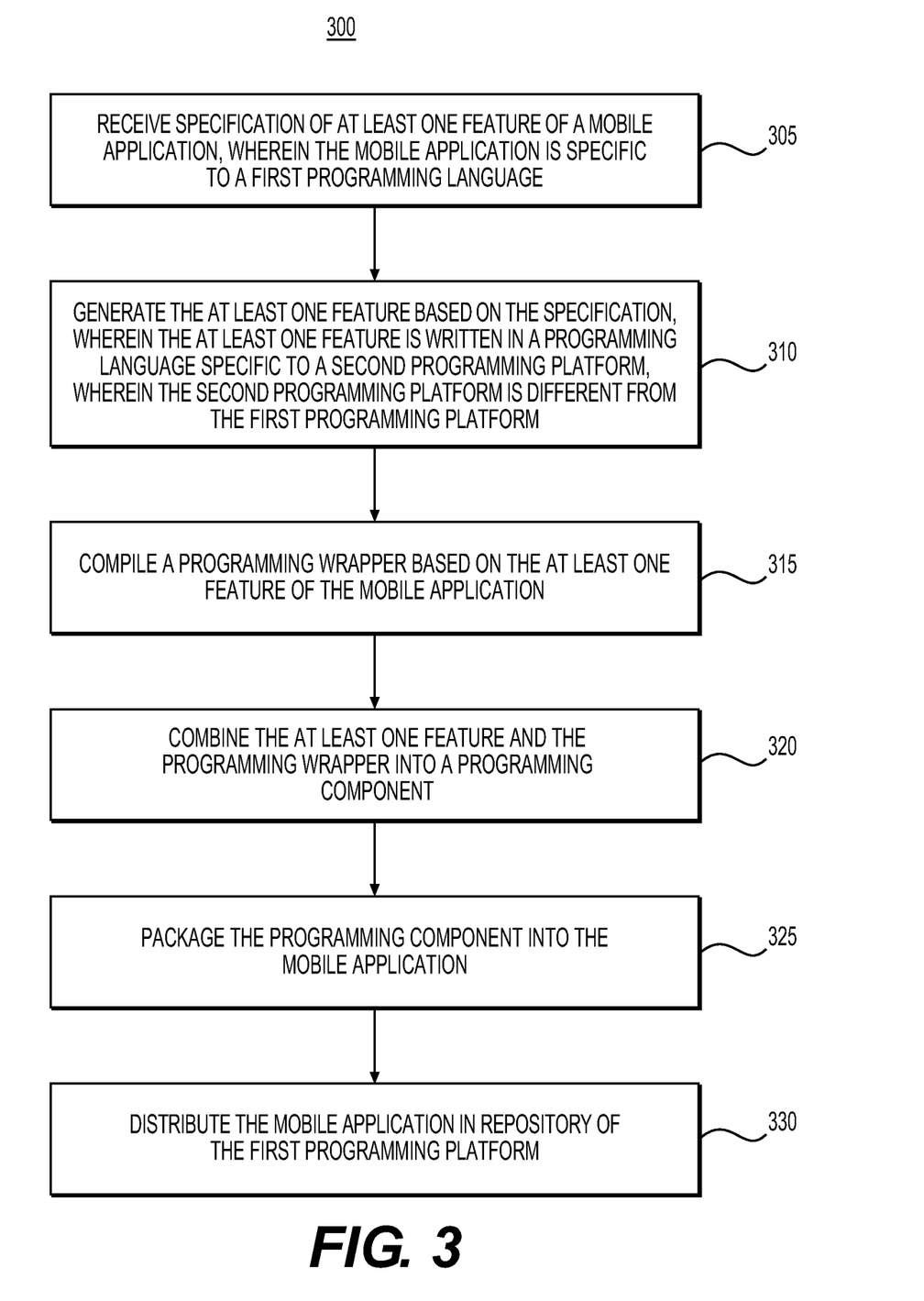
FIG. 3 depicts a flowchart of an exemplary method for providing a hybrid mobile application.

FIG. 3 depicts a flowchart of an exemplary method 300 for providing a hybrid mobile application 132, according to one embodiment. In an initial step 305, the one or more processors 111 may receive specification of at least one feature 205a-205d of mobile application 132. As detailed above, the mobile application 132 may be specific to a first programming platform. For example, mobile application 132 may be an Android application or an iOS application. In some embodiments, the one or more processors 111 may store the received specification. For example, the one or more processors 111 may store the specification in feature specification database 112.

In step 310, the one or more processors 111 may generate the at least one feature 205a-205d based on the specification. The at least one feature 205a-205d may be written in a programming language specific to a second programming platform and the second programming platform may be different from the first programming platform. For example, the at least one feature 205a-205d may be written in a programming language specific to Flutter, React Native, Xamarin, or any other programming platform.

In step 315, the one or more processors 111 may compile a programming wrapper 210 based on the at least one feature 205a-205d of the mobile application 132. As detailed above, the programming wrapper 210 may include various scripts for providing and encapsulating various features, functionalities, and/or interfaces. The one or more processors 111 may store the programming wrapper 210 in, for example, programming wrapper database 114.

In step 320, the one or more processors 111 may combine the at least one feature 205a-205d and the programming wrapper 210 into a programming component 220. For example, the at least one feature 205a-205d and the programming wrapper 210 may be embedded into the programming wrapper module 215, and the one or more processors 111 may generate the programming component 220. The one or more processors 111 may store the programming component 220 in, for example, the programming component database 115. As detailed above, the programming component 220 may include the at least one feature 205a-205d, the programming wrapper 210, and the one or more frameworks of the programming wrapper module 215.

In step 325, the one or more processors 111 may package the programming component 220 into the mobile application 132. Thus, the programming component 220 may include a library that may be packaged into various mobile applications 132 for various programming platforms (e.g., the first programming platform and/or the third programming platform).

In step 330, the one or more processors 111 may distribute the mobile application 132 in a repository 140 of the first programming platform. For example, the one or more processors 111 may distribute the mobile application 132 into an Application store (e.g., Google Play Store) of the first programming platform.

In some embodiments, the one or more processors 111 may translate, via the programming wrapper 210 (e.g., included within the programming wrapper module 215), the at least one feature 205a-205d from the second programming platform to the first programming platform. For example, the one or more processors 111 may translate the at least one feature 205a-205d from Flutter to Android. The one or more processors 111 may then execute the at least one feature 205a-205d in the mobile application 132.

In some embodiments, mobile application may 132 may be a first mobile application 132 and the one or more processors 111 may package the programming component 220 into a second mobile application 132 specific to a third programming platform. The third programming platform may be different from the first programming platform and the second programming platform. For example, the third programming platform may include Apple iOS®. The one or more processors 111 may distribute the second mobile application 132 in repository 150 of the third programming platform. The one or more processors 111 may receive an activation of the at least one feature 205a-205d in the second mobile application 132 and invoke the programming component 220 by the second mobile application 132. The one or more processors 111 may then translate, via the programming wrapper 210 (e.g., included within the programming wrapper module 215), the at least one feature 205a-205d from the second programming platform to the third programming platform and execute the at least one feature 205a-205d in the second mobile application 132.

FIG. 4 depicts an example system 400 that may execute techniques presented herein. FIG. 4 is a simplified functional block diagram of a computer that may be configured to execute techniques described herein, according to exemplary embodiments of the present disclosure. Specifically, the computer (or "platform" as it may not be a single physical computer infrastructure) may include a data communication interface 460 for packet data communication. The platform also may include a central processing unit ("CPU") 420, in the form of one or more processors, for executing program instructions. The platform may include an internal communication bus 410, and the platform also may include a program storage and/or a data storage for various data files to be processed and/or communicated by the platform such as ROM 430 and RAM 440, although the system 400 may receive programming and data via network communications. The system 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for providing a hybrid mobile application, the method comprising:
receiving, by one or more processors, specification of at least one feature of a mobile application, wherein a first configuration of the mobile application is specific to a first programming platform and a second configuration of the mobile application is specific to a third programming platform different than the first programming platform;

generating, by the one or more processors, the at least one feature based on the specification, wherein the at least one feature is written in a programming language specific to a second programming platform, wherein the second programming platform is different from the first programming platform and the third programming platform;

compiling, by the one or more processors, a second programming platform wrapper based on the at least one feature of the mobile application;

combining, by the one or more processors, the at least one feature, the second programming platform wrapper, and one or more frameworks of the second programming platform wrapper into a single programming component for packaging into each of the first configuration and the second configuration of the mobile application, the one or more frameworks enabling translation of the at least one feature to a programming language specific to the first programming platform and a programming language specific to the third programming platform;

packaging, by the one or more processors, the single programming component into each of the first configuration and the second configuration of the mobile application; and distributing, by the one or more processors, the first configuration of the mobile application in a repository of the first programming platform and the second configuration of the mobile application in a repository of the third programming platform.

2. The computer-implemented method of claim 1, further including:

receiving, by the one or more processors, an activation of the at least one feature in the second configuration of the mobile application.

3. The computer-implemented method of claim 2, further including:

invoking, by the one or more processors, the single programming component by the second configuration of the mobile application.

4. The computer-implemented method of claim 3, further including:

translating, by the one or more processors via the one or more frameworks of second programming platform wrapper in the single programming component, the at least one feature from the programming language specific to the second programming platform to the programming language specific to the third programming platform; and executing, by the one or more processors, the at least one feature in the second configuration of the mobile application.

5. The computer-implemented method of claim 1, further including:

translating, by the one or more processors via the one or more frameworks of the second programming platform wrapper in the single programming component, the at least one feature from the programming language specific to the second programming platform to the programming language specific to the first programming platform in response to receiving an activation of the at least one feature in the first configuration of the mobile application.

6. The computer-implemented method of claim 5, further including:

executing, by the one or more processors, the at least one feature in the first configuration of the mobile application.

7. The computer-implemented method of claim 1, wherein the repository of the first programming platform is a first application store and the repository of the third programming platform is a second application store that is different than the first application store.

8. The computer-implemented method of claim 1, wherein the second programming platform is at least one of Flutter, React Native, or Xamarin.

9. The computer-implemented method of claim 1, wherein the single programming component is a library including the at least one feature, the second programming platform wrapper, and the one or more frameworks of the second programming platform wrapper.

10. The computer-implemented method of claim 9, wherein packaging the single programming component into each of the first configuration and the second configuration of the mobile application comprises packaging the library into code of each of the first configuration and the second configuration of the mobile application.

11. A computer system for providing a hybrid mobile application, the computer system comprising:

a memory having processor-readable instructions stored therein; and at least one processor configured to access the memory and execute the processor-readable instructions, which when executed by the at least one processor configures the at least one processor to perform a plurality of functions, including functions for:

receiving specification of at least one feature of a mobile application, wherein a first configuration the mobile application is specific to a first programming platform and a second configuration of the mobile application is specific to a third programming platform different than the first programming platform;

generating the at least one feature based on the specification, wherein the at least one feature is written in a programming language specific to a second programming platform, wherein the second programming platform is different from the first programming platform and the third programming platform;

compiling a second programming platform wrapper based on the at least one feature of the mobile application;

combining the at least one feature, the second programming platform wrapper, and one or more frameworks of the second programming platform wrapper into a single programming component for packaging into each of the first configuration and the second configuration of the mobile application, the one or more frameworks enabling translation of the at least one feature to a programming language specific to the first programming platform upon activation of the at least one feature in the first configuration of the mobile application and to a programming language specific to the third programming platform upon activation of the at least one feature in the second configuration of the mobile application;

packaging the single programming component in to into each of the first configuration and the second configuration of the mobile application; and distributing the first configuration of the mobile application in a repository of the first programming platform and the second configuration of the mobile application in a repository of the third programming platform.

12. The computer system of claim 11, wherein the functions further include:
receiving an activation of the at least one feature in the second configuration of the mobile application.

13. The computer system of claim 12, wherein the functions further include:
invoking the single programming component by the second configuration of the mobile application.

14. The computer system of claim 13, wherein the functions further include:
translating, via the one or more frameworks of the second programming platform wrapper in the single programming component, the at least one feature from the programming language specific to the second programming platform to the programming language specific to the third programming platform; and
executing the at least one feature in the second configuration of the mobile application.

15. The computer system of claim 11, wherein the functions further include:
translating, via the one or more frameworks of the second programming platform wrapper in the single programming component, the at least one feature from the programming language specific to the second programming platform to the programming language specific to the first programming platform in response to receiving an activation of the at least one feature in the first configuration of the mobile application.

16. The computer system of claim 15, wherein the functions further include:
executing the at least one feature in the first configuration of the mobile application.

17. The computer system of claim 11, wherein the repository of the first programming platform is a first application store and the repository of the third programming platform is a second application store that is different than the first application store.

18. The computer system of claim 11, wherein the first programming platform is an Android platform, the second programming platform is at least one of Flutter, React Native, or Xamarin, and the third programming platform is an iOS platform.

19. The computer system of claim 11, wherein the single programming component is a library, and packaging the single programming component into each of the first configuration and the second configuration of the mobile application comprises packaging the library into code of each of the first configuration and the second configuration of the mobile application.

20. A computer-implemented method for providing a hybrid mobile application, the method comprising:
receiving, by one or more processors, specification of at least one feature of a mobile application, wherein a first configuration of the mobile application is specific to a first programming platform and a second configuration of the mobile application is specific to a third programming platform different than the first programming platform;
generating, by the one or more processors, the at least one feature based on the specification, wherein the at least one feature is written in a programming language specific to a second programming platform, wherein the second programming platform is different from the first programming platform and the third programming platform;
compiling, by the one or more processors, a second programming platform wrapper based on the at least one feature of the mobile application;
combining, by the one or more processors, the at least one feature, the second programming platform wrapper, and one or more frameworks of the second programming platform wrapper into a single programming component for packaging into each of the first configuration and the second configuration of the mobile application;
packaging, by the one or more processors, the single programming component into each of the first configuration and the second configuration of the mobile application;
receiving, by the one or more processors, an activation of the at least one feature in one or more of the first configuration or the second configuration of the mobile application;
invoking, by the one or more processors, the single programming component by a respective one or more of the first configuration or the second configuration of the mobile application;
translating, by the one or more processors via the one or more frameworks of the second programming platform wrapper in the single programming component, the at least one feature from the programming language specific to the second programming platform to the respective one or more of the programming language specific to the first programming platform or the programming language specific to the third programming platform; and
executing, by the one or more processors, the at least one feature in the respective one or more of the first configuration or the second configuration of the mobile application.

* * * * *